Oct. 17, 1933.  W. G. COOK  1,930,509
CONTROL APPARATUS
Filed March 17, 1930   5 Sheets-Sheet 1

INVENTOR
Willard G. Cook
BY
Chesley G. Carr
ATTORNEY

Oct. 17, 1933.  W. G. COOK  1,930,509

CONTROL APPARATUS

Filed March 17, 1930   5 Sheets-Sheet 2

INVENTOR
Willard G. Cook
BY
ATTORNEY

Patented Oct. 17, 1933

1,930,509

UNITED STATES PATENT OFFICE 1,930,509

CONTROL APPARATUS

Willard G. Cook, Forest Hills, Wilkinsburg, Pa., assignor to Westinghouse Electric & Manufacturing Company, a corporation of Pennsylvania Application March 17, 1930. Serial No. 436,317

22 Claims. (Cl. 172—179)

My invention relates to control apparatus and more particularly to a time-limit reversing control system for reversing motors such as are used to drive rolling mill tables or similar reciprocating devices.

One object of my invention is to provide for controlling the time of reversal of a reversing motor.

More specific objects of my invention are, to provide for limiting the current flowing through a motor, at the instant of the reversal of the connections while the motor is rotating in a given direction, i. e., during plugging, to a value to prevent damage to the motor and to provide for controlling the period of reversal of the motor during plugging as a function of the counter-electromotive force of the motor, the counter-electromotive force of the motor and a definite interval of time, or a definite interval of time only, as desired.

A further object of my invention is to provide a system of control for a reversing motor that shall be simple and efficient in operation, comparatively inexpensive and easy of manufacture in view of the relatively few parts required, and which may be readily applied to a reversing motor.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
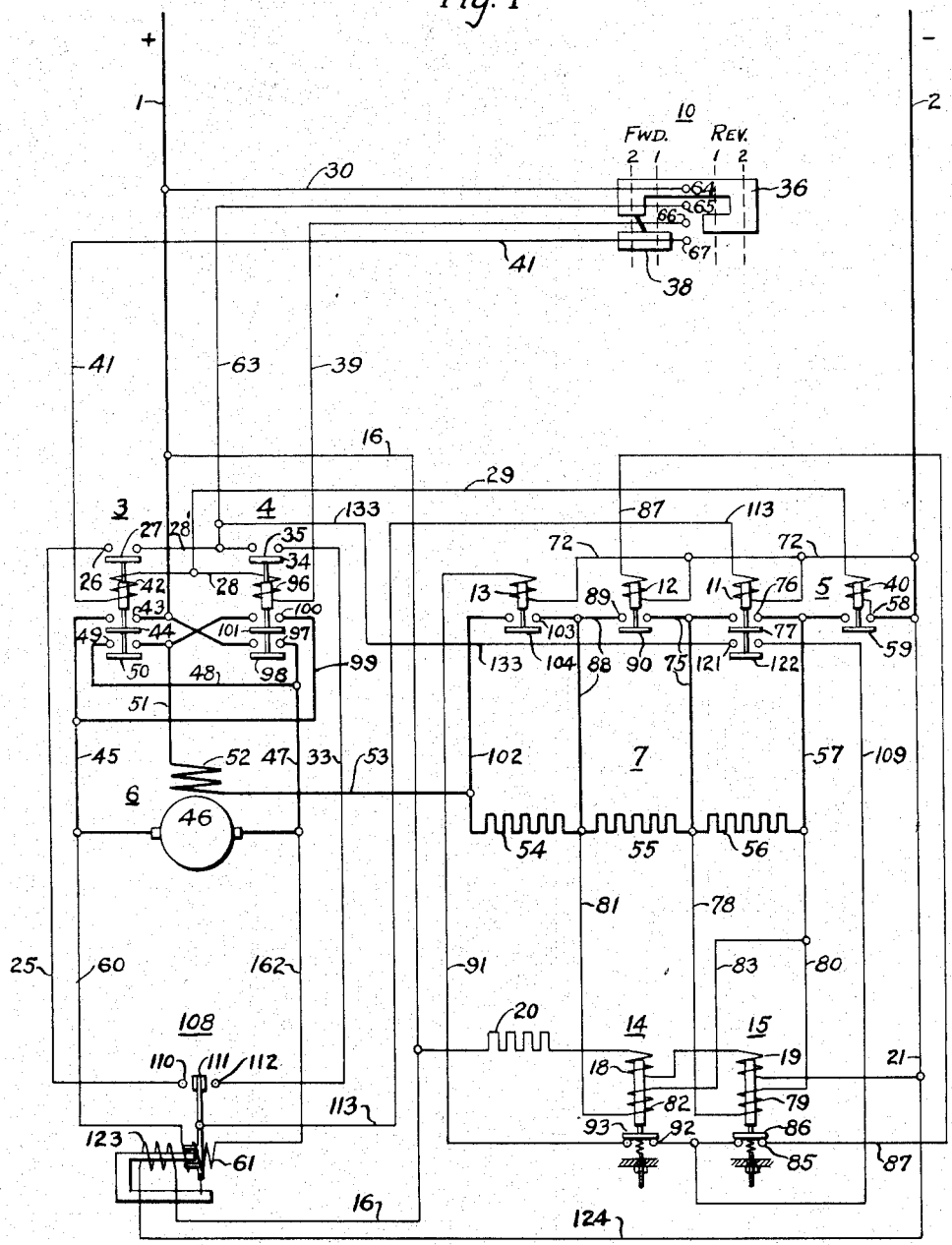
Figure 1 shows diagrammatically a reversing control system wherein the time of reversal is determined by the inertia of the load.

In the following discussion, corresponding reference characters refer to corresponding parts in all the modifications shown, and different reference characters are used only for the different modifications when the elements referred to are either entirely different, or the same elements shown in several modifications have entirely different functions in different modifications.

Referring more particularly to Fig. 1 of the drawings, 1 and 2 designate the positive and negative line conductors of a source of power, and 6 designates a motor for driving a reciprocating device. The directional contactors are designated by 3 and 4; and 7 has reference to a starting resistor having resistor sections 54, 55 and 56 controlled by a plurality of short circuiting switches or accelerating relays, which are in turn controlled by a pair of time-limit relays 14 and 15. The entire control system is controlled by a manual controller 10. A polarized plugging relay 108 responsive to the counter-electromotive force of the motor is provided and thus controls the time of the plugging operation according to the inertia of the load driven by the motor 6.

Assuming that lines 1 and 2 are not energized, then the various elements hold the position shown in Fig. 1. If the switch (not shown) in the lines 1 and 2 be closed and the controller 10 be in the off position, then a circuit is established from the positive line 1 through conductor 16, polarizing coil 123 of plugging relay 108, conductors 124 and 21 to the negative line 2. In parallel circuit relation to the polarizing coil 123 is disposed a resistor 20, neutralizing coil 18 of the time limit relay 14, neutralizing coil 19 of the time limit relay 15 and conductor 21 to the negative line 2. Polarizing coil 123 alone is not sufficiently strong to cause movement of contact 111 to engage with either of the contacts 110 or 112.

Movement of the controller 10 to the first forward position establishes a circuit from the positive line 1 through conductor 30, contact fingers 64 and 67, bridged by the connected controller segments 36 and 38, conductor 41, actuating coil 42 of directional contactor 3, conductors 28 and 29, actuating coil 40 of the line contactor 5 to the negative line 2. Energization of actuating coils 42 and 40 of the directional contactor 3 and line contactor 5 respectively, causes the closing of the contacts associated with contactors 3 and 5. A motor circuit is thereby established from the positive line 1, contacts 43, bridged by the interlock 44, conductor 45, armature 46 of the motor 6, conductors 47 and 48, contacts 49, bridged by bridging member 50, conductor 51, series field winding 52, and the starting resistor sections 54, 55 and 56, conductor 57, contacts 58, bridged by the bridging member 59 to the negative line 2. Connected across the armature terminals is a circuit through conductor 60, movable actuating coil 61, of the polarized plugging relay 108, and conductor 162.

When the controller stands in the first forward position regardless of whether the motor starts rotating or not, the resistance drop across the armature is sufficient to cause movement of the contact 111 of the polarized relay 108 to establish a circuit through contacts 110 and 111. Furthermore, since the voltage is applied to the starting resistor 7, the drop across the resistor sections 55 and 56 causes the energization of magnetizing coils 79 and 82 of the time limit relays 15 and 14 and the consequent opening of contacts 92 and 85.

The controller may now be moved to the second forward position thus engaging contact fingers 65 with the controller segment 36. A circuit is thereby established from the positive line 1 through conductor 30, contact fingers 64 and 65, of the controller 10 bridged by the controller segment 36, conductor 63, conductor 28', contacts 26, bridged by the interlock 27 on the directional contactor 3, conductor 25, contacts 110 and 111, conductor 113, actuating coil 11, and conductor 72 to the negative line 2. It will be noted that this circuit immediately causes the short circuiting of the plugging resistor section 56. The plugging resistor section 56 is not strictly a part of the starting resistor but is a resistor section having a rather high resistance value to prevent excessive current through the motor during plugging operation, as will be pointed out more in detail hereinafter.

Since the energization of coil 11 established the short circuit for plugging resistor section 56 through conductor 75, contacts 76, bridged by bridging member 77 and conductor 57, the circuit through 78 and magnetizing coil 79 is deenergized and the time limit relay 15 will close its contact 85 after a predetermined interval of time. After the lapse of this predetermined limit of time, a circuit is established from the energized conductor 63, conductor 133, contacts 121, bridged by bridging member 122, conductor 109, contacts 85 bridged by bridging member 86, conductor 87, actuating coil 12, and conductor 72 to the negative line 2. Energization of coil 12 establishes a short circuit for resistor section 55 by the circuit through conductor 88, contacts 89, bridging member 90 and conductor 75. Similar to the deenergization of the magnetizing coil 79 previously discussed, magnetizing coil 82 is now deenergized and the time-limit relay 14 will close its contact 92 after a predetermined interval of time.

After the lapse of time for which the relay 14 has been set, a circuit is established from the energized conductor 109, through contacts 92, bridged by bridging member 93, conductor 91, actuating coil 13 and conductor 72 to the negative line 2. Energization of coil 13 causes a short circuiting of the last resistor section 54 through the conductor 102, contacts 103, bridging member 104, and conductor 88. The motor is now running at full forward speed.

Assuming that it is desired to plug the motor while it is running at full forward speed, then the controller 10 is moved to the full reverse position and the directional contactor 4 is energized, closing the contacts 35, 100 and 97, associated with this contactor, and the contacts 58 of the line contactor 5 are closed. Because of the inertia of the load, which is of considerable value in steel-mill equipment, and the inertia of the rotating armature, rotation of the armature will continue in the same direction and the counter-electromotive force of the motor does not immediately diminish nor change sign. During the movement of the controller from the full-forward to the full-reverse position contactor 3 and the coils 11, 12 and 13 are deenergized and all of the sections of the starting resistor are connected in series with the motor.

It is very desirable that the resistance in series with the motor during plugging be quite high to prevent excessive currents passing through the armature which might injure the motor. The plugging relay 108 accomplishes this desirable result. It will be noted that when directional contactor 4 closes during the plugging operation, the voltage impressed upon movable coil 61 of the polarized plugging relay 108, is still in the same direction and in consequence contact members 110 and 111 remain closed until the resistance drop across the armature overbalances the counter-electromotive force. When this takes place, the voltage impressed on the armature terminals being reversed causes energization of coil 61 in a direction opposite to its previous energization. A circuit is thus established from the positive line 1 through conductor 30, contact fingers 64 and 65, conductor 63, contacts 35, bridged by the interlock 34 on directional contactor 4, conductor 33, contact members 111 and 112, conductor 113, actuating coil 11 and conductor 72 to the negative line. By reason of the delay in the closing of contact members 111, 112 by the plugging relay 108 until the motor speed has substantially decreased to zero, the coil 11 could not be energized to short circuit plugging resistor section 56. The plugging resistor section 56, having a relatively high ohmic value, thus remains connected in the armature circuit during deceleration of the motor thereby preventing excessive currents through the armature during plugging operation.

Energization of coil 11 in addition to the short-circuiting of the plugging resistor section 56, causes the closing of contact members 121 and the deenergization of the magnetizing coil 79. After a predetermined interval of time, depending upon the action of the neutralizing coil 19 and the adjustment of the spring associated with the time-limit relay 15, contact members 85 close and a circuit is established for the actuating coil 12 which extends from the energized conductor 63, through conductor 133, contact members 121, bridging member 122, conductor 109, contact member 85, bridging member 86 of time-limit relay 15, conductor 87, actuating coil 12 and conductor 72 to the negative line 2. In a similar manner the coil 13 is energized and the last resistor section 54 is shunted and the motor then operates at full speed in the reverse direction.

It is understood, of course, that if it is desired to start initially in the reverse direction the controller is moved in the reverse direction from the first to the second reverse position, and the sequence of operation and the circuits established for the motor and the various elements of the control system are similar to the sequence of operation of the circuit above described in connection with the controller movement in the forward direction.

Figure 2:
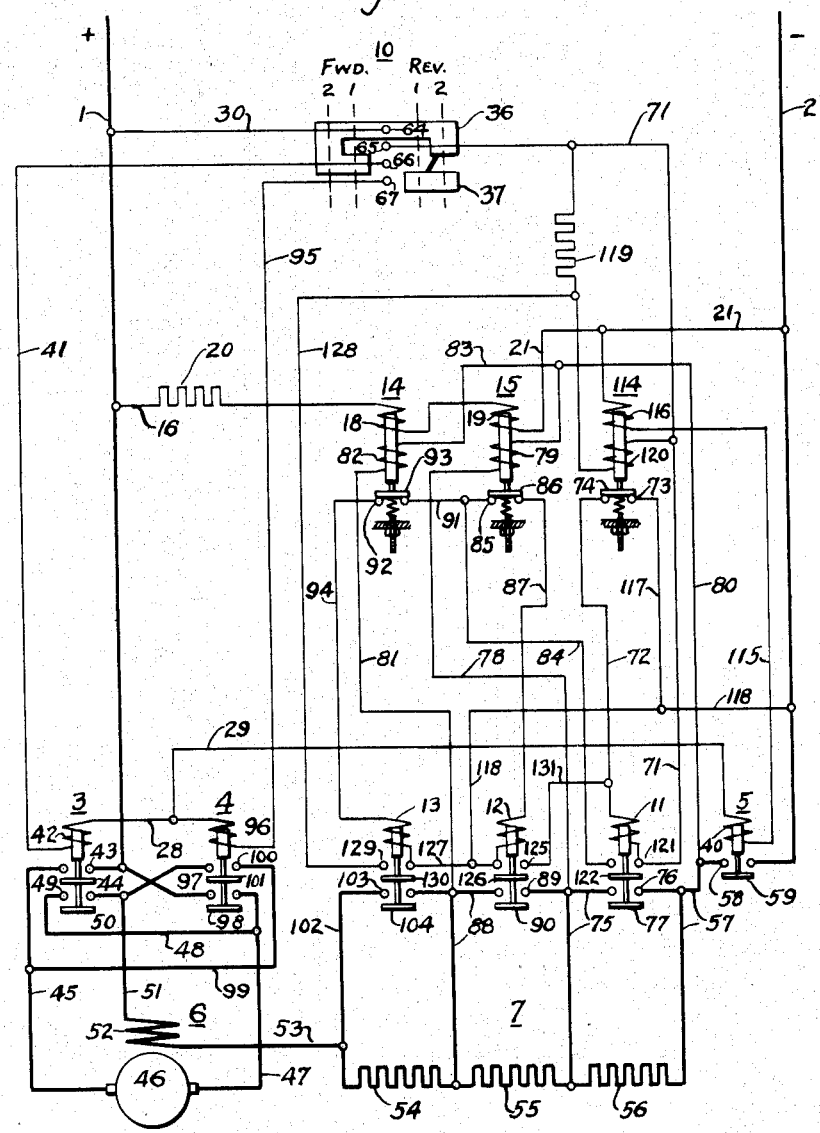
Figs. 2 and 3 show diagrammatically modifications of the reversing control system wherein the time of reversal is controlled by time limit devices.

When it is desired to limit the plugging operation to a definite time interval, the scheme shown in Fig. 2 is utilized. When the controller is in the "off" position and the positive and negative lines are energized, a circuit is established from the positive line 1, through conductor 16, resistor 20, neutralizing coils 18 and 19 of the time-limit relays 14 and 15 and conductor 21 to the negative line 2. Upon movement of the controller 10 to the first forward position a circuit is established from the positive line 1, through conductor 30, contact fingers 64 and 66, bridged by the controller segment 36, conductor 41, actuating coil 42, of the directional contactor 3, conductors 28 and 29, actuating coil 40 of line contactor 5, conductor 115, neutralizing coil 116 of time-limit relay 114 and the conductor 21 to the negative line 2. The contacts associated with the directional contactor 3 immediately close and the contact members of the line contactor 5 close, whereas the time-limit relay 114 does not operate since only the neutralizing coil 116 is energized.

A motor circuit is established by the operation of contactors 3 and 5 which is alike in every particular to the motor circuit traced in connection with the first forward position of the controller 10 for the modification shown in Fig. 1. Since, for this first forward controller position the starting resistor sections 54, 55 and the plugging resistor 56 are in series with the series field winding 52 and the armature 46 of motor 6, the resistance drop across the resistor sections 55 and 56 causes the energization of a circuit through conductor 78, magnetizing coil 79 of time-limit relay 15, conductor 80, and through line contactor 5 to the negative line 2. Similarly, a circuit is established through conductor 81, magnetizing coil 82 of the time-limit relay 14 and conductor 83 to the conductor 80. The contacts 92 and 85 of the time-limit relays 14 and 15 therefore are immediately opened.

Movement of the controller to the second forward position causes the bridging of contact members 64 and 65 by the controller segment 36 and a circuit is established which extends through conductor 71, one junction of contacts 121, actuating coil 11, conductor 72, contacts 73, bridged by bridging member 74 and conductors 117 and 118 to the negative line 2. Energization of coil 11 causes the immediate closing of the contact members associated with that particular accelerating relay, and the plugging resistor section 56 is shunted by the conductor 75, contact member 76 bridged by bridging member 77. The circuit previously traced for the magnetizing coil 79 is thus deenergized and the time-limit relay 15 is actuated to close its contacts after the lapse of a predetermined interval of time.

Attention is called to the fact that when coil 11 was energized, coil 120 of the time-limit relay 114 was also connected in that circuit, however, since coil 120 during this stage of operation is in series with the discharge resistor 119, the time-limit relay 114 is not caused to operate and the contact members 73 remain closed.

After the lapse of the time interval, determined by the spring adjustment and the neutralizing coil 19 of time relay 15, a circuit is established from the energized conductor 71, through contact members 121, bridging member 122, conductor 84, contact members 85 bridged by the bridging member 86, conductor 87, actuating coil 12 of the second accelerating relay and conductor 118 to the negative line 2. It will be noted that upon operation of the accelerating relay having the coil 12, contact members 125 closed, thus shunting the circuit established through the contacts 73 of the time-limit relay 114. Actuating coil 11 thus may remain energized regardless of whether contact members 73 are closed or not.

Energization of coil 12 causes the shunting of the resistor section 55 and the consequent deenergization of the magnetizing coil 82 of the time-limit relay 14. After a predetermined interval of time depending upon the spring adjustment and the neutralizing coil of the time-limit relay 14, the contact members 92 are closed, establishing a circuit which may be traced from the energized conductor 84 through conductor 91, contact members 92 bridged by bridging member 93, conductor 94, actuating coil 13 and conductors 127 and 118 to the negative line 2. Energization of coil 13 immediately causes the shunting of the resistor section 54 by the circuit through conductor 102, contact members 103 and bridging member 104. Energization of coil 13 also causes the closing of contact members 129 thereby establishing a circuit from the energized conductor 71 through the magnetizing coil 120, conductor 128, contact members 129 bridged by the bridging member 130, and conductors 127 and 118, to the negative line 2. Since, for this circuit, the magnetizing coil 120 is not in series with the discharge resistor 119 the current traversing this coil is sufficiently strong to immediately cause opening of contacts 73.

Assuming that the motor is operating at full speed in a forward direction, and that the attendant desires to plug the motor, then the movement of the controller from the "full speed forward" position through the "off" position to the "full speed reverse" position interrupts the circuits for the actuating coils of the accelerating relays and causes the opening of the contact members associated with the accelerating relays. Magnetizing coil 120 is thereby deenergized and a predetermined interval of time must elapse before contact members 73 close to complete the circuit for the actuating coil 11 of the accelerating relay associated with the plugging resistor 56. The plugging resistor section 56 which has a high ohmic value is retained in the armature circuit for a definite time interval. The time interval for which the time-limit relay 114 stands adjusted by means of its adjusting spring and the neutralizing coil 116 is, of course, so chosen as to have some definite relation to the time required to decelerate the motor.

If the controller is moved from the "full forward" position to the "off" position and then immediately moved again to the "forward position" the motor will decelerate to a slow speed, since resistor 7 is in series with the motor, during the time interval for which the time-limit relay 114 is set. This sequence of operation is not necessary since the controller is moved again to the forward position. To eliminate this delay in forward operation, the modification shown in Fig. 3 was provided.

If the attendant should move the controller from the "full forward" position to the "off" position and hold the controller in the "off" position for a short interval of time and then plug the motor the actuating coil 11 may be energized immediately and shunt the plugging resistor section 56 and subject the motor to excessive current surges. To prevent such large currents from traversing the motor circuit the time-limit relay 114 is so designed that the residual magnetism will retain contacts 73 open as long as the neutralizing coil 116 is not energized.

By this arrangement the attendant cannot shorten the time interval of the plugging operation since upon movement of the controller to the "full reverse" position neutralizing coil 116 will be energized and contacts 73 will not close prior to the lapse of time for which the time-limit relay 114 has been adjusted.

Figure 3:
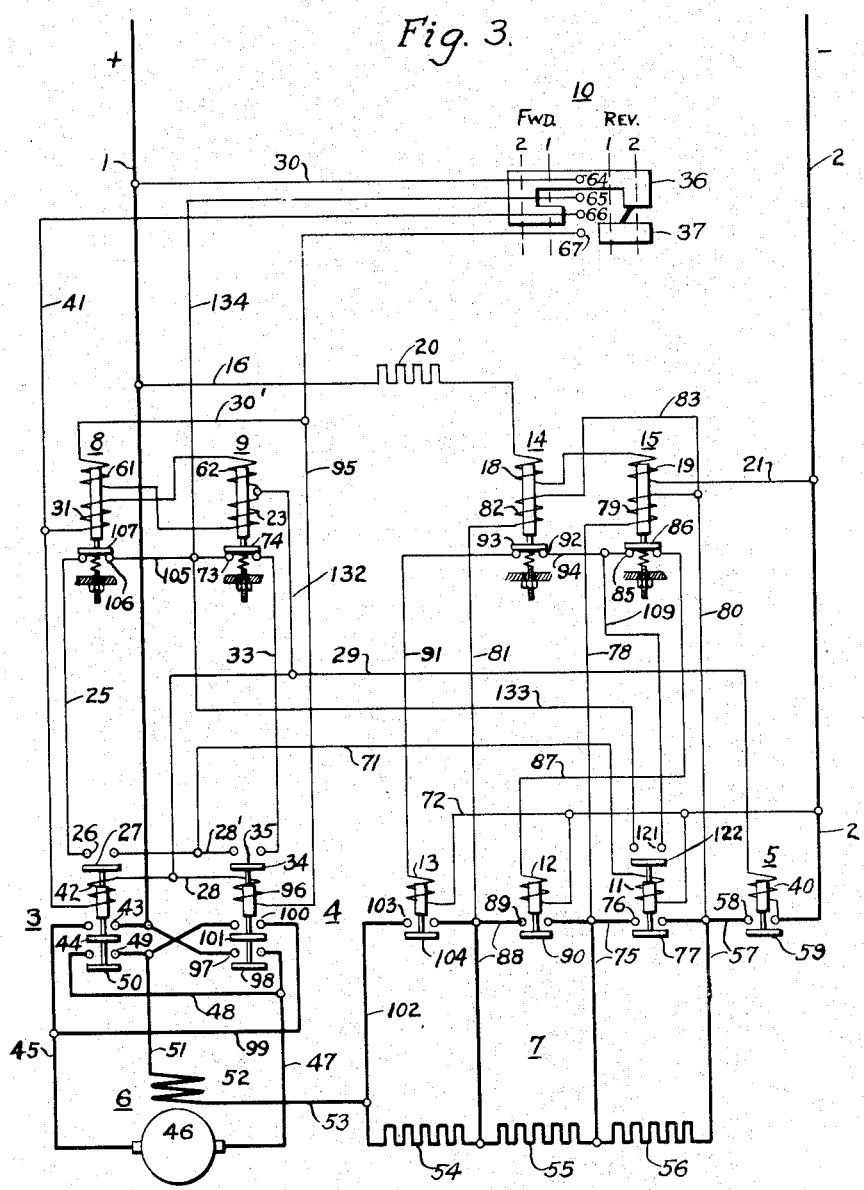

In the modification shown in Fig. 3, a system of control is shown somewhat similar to the modification shown in Fig. 2, however, the motor will not come to rest if the control is moved from the "full forward" to the "off" position and then to the "full forward" position but will immediately accelerate to regain the full forward speed.

When lines 1 and 2 are energized and the controller is in the "off" position the neutralizing windings of the time-limit relays 14 and 15 are energized by a circuit similar to the circuit traced in connection with the modifications above discussed. Movement of the controller to the "first forward" position causes operation of the directional contactor 3 and the line contactor 5 thereby establishing a motor circuit for the forward direction of operation corresponding in every particular to the corresponding circuit above discussed. However, during energization of the directional contactor 3 and the line contactor 5, a circuit is also established from the positive line 1 through conductor 30, contact fingers 64 and 66, bridged by the controller segment 36, conductor 41, neutralizing coil 31, of the reverse time-limit relay 8, magnetizing coils 62 of the forward time-limit relay 9, conductors 132 and 29 and actuating coil 40 to the negative line 2. Establishment of this circuit causes the opening of contact members 73, however, the contacts 106 do not open since only the neutralizing coil 31 is energized. Since the resistor sections 55 and 56 are in series with the motor circuit, time-limit relays 14 and 15 immediately operate to open contact members 92 and 85.

Upon movement of the controller to the "second forward" position, contact fingers 64 and 65 are bridged by the controller segment 36 and a circuit is completed through conductors 134 and 105, contact members 106, bridged by the bridging member 107, conductor 25, contact members 26, bridged by the interlock 27 on the directional contactor 3, and conductors 28' and 71, actuating coil 11 of the first accelerating relay through conductors 72 to the negative line 2. The contact members associated with the first accelerating relay immediately close and the plugging resistor section 56 is shunted. Magnetizing coil 79 of the time-limit relay 15 is thereby deenergized, and after a predetermined interval of time depending both upon the spring adjustment and the neutralizing coil 19, of the time-limit relay 15, a circuit is established from the energized conductor 105 through conductor 133, contacts 121 bridged by the bridging member 122, conductor 109, contact members 85, bridged by the bridging member 86, conductor 87, the actuating coil 12 of the second accelerating relay and conductor 72 to the negative line 2. The shunting of resistor section 55 deenergizes magnetizing coil 82 of the time-limit relay 14 and after a predetermined interval of time, depending upon the spring adjustment and the demagnetizing coil 18 of time-limit relay 14, a circuit is established from the energized conductor 109 through conductor 94, contact members 92, bridged by bridging member 93, conductor 91, actuating coil 13, and conductor 72, to the negative line 2, thereby short-circuiting the resistor section 54 by the circuit through conductor 102, contact members 103 and bridging member 104. Upon the shunting of resistor section 54 the motor accelerates to "full forward" speed.

Movement of the controller to the "full reverse" position immediately causes the operation of directional contactor 4 and the deenergization of directional contactor 3 and forward time-limit relay 9. At the same time the magnetizing coil 61 of the reverse time-limit relay 8 is energized causing the opening of contacts 106. By this operation all of the resistor sections of the startling resistor 7 are connected in series in the motor circuit and excessive currents through the motor circuit are prevented. While the motor decelerates the forward time-limit relay 9 being deenergized closes its contacts after a predetermined interval of time, thus preventing the energization of coil 11 and the consequent shunting of plugging resistor section 56 prior to the lapse of time for which the forward time-limit relay 9 has been adjusted.

Attention is called to the fact that the advantageous functions discussed in connection with the operation of the time-limit relay 114 of the modification shown in Fig. 2, and of the plugging relay 108 of the modification shown in Fig. 1, are also present. If the controller be moved from the "full forward" to the "neutral" position and then, after a slight hesitation at the neutral position, is moved to the "full reverse" position an energizing circuit for the actuating coil 11 cannot be established prior to the lapse of the desired time, since contacts 106 are retained in open position by the residual magnetism of time-limit relay 8 during the pause in the "off" position. The energization of the actuating coil 11 during plugging operation is thus always controlled by the time constant of the relays 8 or 9, depending upon what direction the motor was rotating when the plugging operation is initiated.

Figure 4:
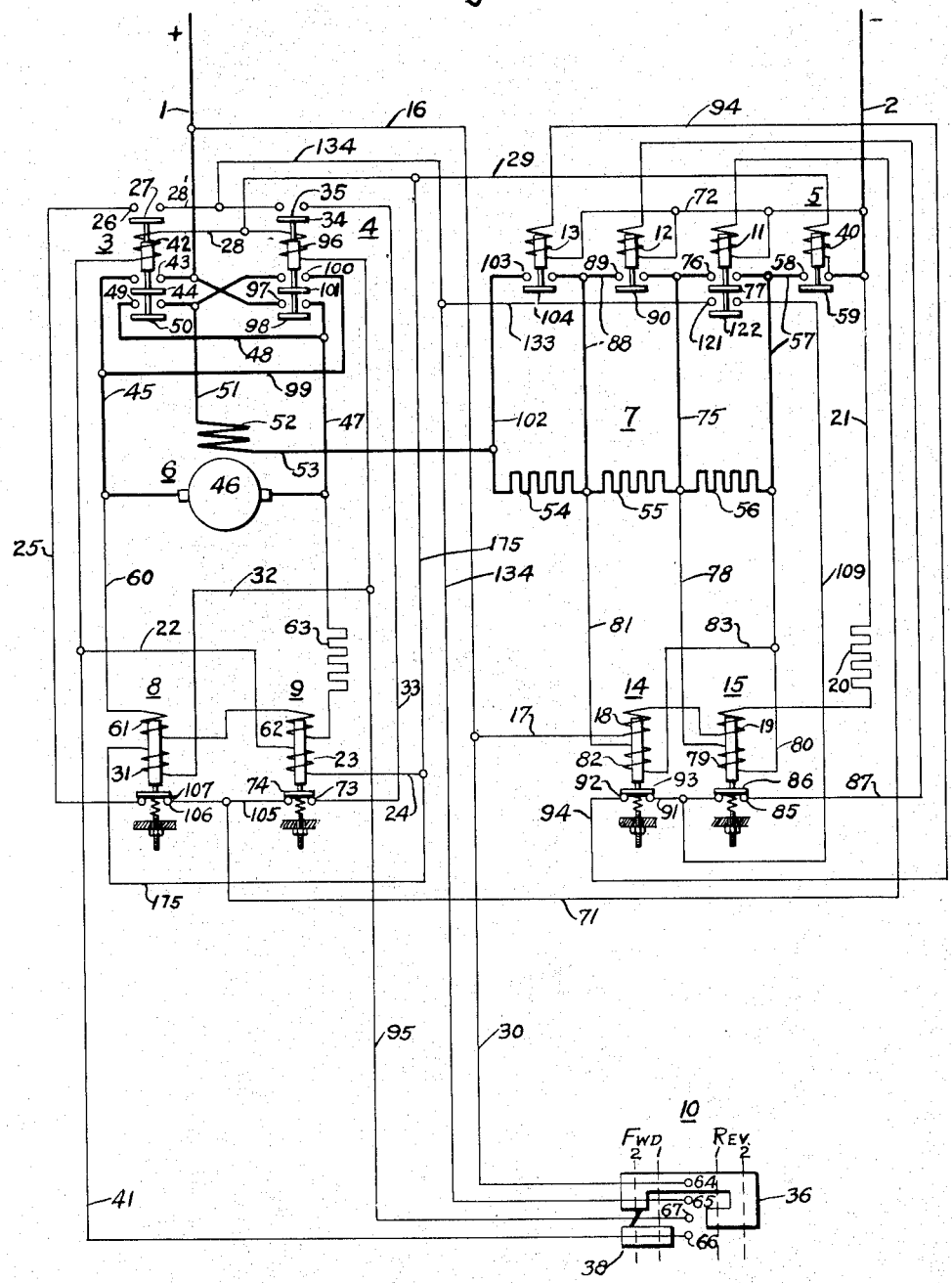
Figs. 4 and 5 show diagrammatically modifications of the reversing control system wherein the time of reversal is controlled according to the inertia of the load and time limit devices.

In Fig. 4 a modification is shown wherein the time required to complete the plugging operation is dependent both upon the time constants of a pair of time limit relays and also upon the inertia of the load which the motor may be driving, since the inertia of the load determines the value and time of existence of the counter-electromotive force of the motor.

While the controller is in the "off" position the neutralizing windings 18 and 19 of the time-limit relays 14 and 15 are energized. Movement of the controller to the first "forward" position establishes a circuit from the positive line 1 through conductors 16 and 30, contact fingers 64 and 66, bridged by the connected controller segments 36 and 38, conductor 41, actuating coil 42, of the directional contactor 3, conductors 28 and 29, actuating coil 40 of the line contactor 5 to the negative line 2. A circuit is also established from the energized conductor 41, through conductor 22, magnetizing coil 23, conductors 24 and 175 to the energized conductor 29. Energization of the directional contactor 3 and the line contactor 5 establishes the motor circuit including all of the resistor sections of the starting resistor 7.

Connected across the armature terminals of the motor from the conductors 45 to 47 is a circuit through conductor 60, neutralizing coil 61 of reverse time-limit relay 8, a neutralizing coil 62 of the forward time-limit relay 9 and the resistor 63. Energization of the neutralizing coil 61 has no particular effect and contacts 106 remain closed, however, neutralizing coil 62 is so connected that during forward operation and as long as the motor rotates in the forward direction, it aids the effect of the magnetizing coil 23 and in consequence contact members 73 are opened. Since the motor circuit includes the resistor sections of the starting resistor 7, the magnetizing coils 79 and 82 are energized and contact members 85 and 92 are immediately opened.

Movement of the controller to the "second forward" position causes the bridging of contact fingers 64 and 65 by the controller segment 36, thereby establishing a circuit through the conductors 134 and 28', contact members 26 bridged by the interlock 27 on directional contactor 3, conductor 25, contact members 106 bridged by the bridging member 107, conductors 105 and 71, actuating coil 11 of the first accelerating relay and conductor 72 to the negative line 2. The plugging resistor section 56 having the relatively high resistance value is thereby shunted and contact members 121 are closed. The shunting of the plugging resistor section 56 deenergizes magnetizing coil 79, and after a predetermined interval of time a circuit is established from the energizing conductor 134 through conductor 133, contacts 121, bridging member 122, conductor 109, contact members 85 bridged by the bridging member 86, conductor 87, actuating coil 12 and conductor 72 to the negative line 2. In a similar manner, actuating coil 13 is energized and the resistor section 54 is shunted, thereby bringing the motor up to full forward speed.

It is, of course, understood that the acceleration of the motor in the reverse direction from a state of rest proceeds in every particular similar to the sequence of operation just described for acceleration in the forward direction, except that during such operation directional contactor 4 is operated and reverse time-limit relay 8 is operated to open contact members 106 while contact members 73 of the forward time-limit relay 9 remain closed.

If the attendant plugs the motor, that is, moves the controller from "full forward" to "full reverse" position, directional contactor 4 immediately operates, while directional contactor 3 and the accelerating relays associated with the resistor sections 54, 55 and the plugging resistor 56 are deenergized. At the same time the reverse time-limit relay 8 is energized causing the opening of contact members 106. The neutralizing coil 62 of the forward time-limit relay 9 is however, still energized in its original direction and thus operates as a holding coil as long as the motor rotates in the forward direction. But after the motor has come to rest by reason of the plugging operation, the time of which is dependent upon the inertia of the load and the rotating armature, energization of neutralizing coil 62 is reversed, and the armature of the forward time-limit relay 9 proceeds to descend. After a predetermined interval of time, depending both upon the spring adjustment and the neutralizing coil 62 of time-limit relay 9, contact members 73 close. When contact members 73 close, actuating coil 11 is energized to shunt the plugging resistor section 56.

From the foregoing, it will be apparent that the plugging resistor section 56 cannot be shunted prior to the lapse of time required for the motor to come to rest, plus the time interval for which the time-limit relay 9 has been adjusted. If the attendant moves the controller from the "full forward" position to the "off" position and then again to the "forward" position, the actuating coil 11 is immediately energized upon operation of the directional contactor 3, since the neutralizing coil 61 assured that the contact members 106 remained closed during such operation.

Figure 5:
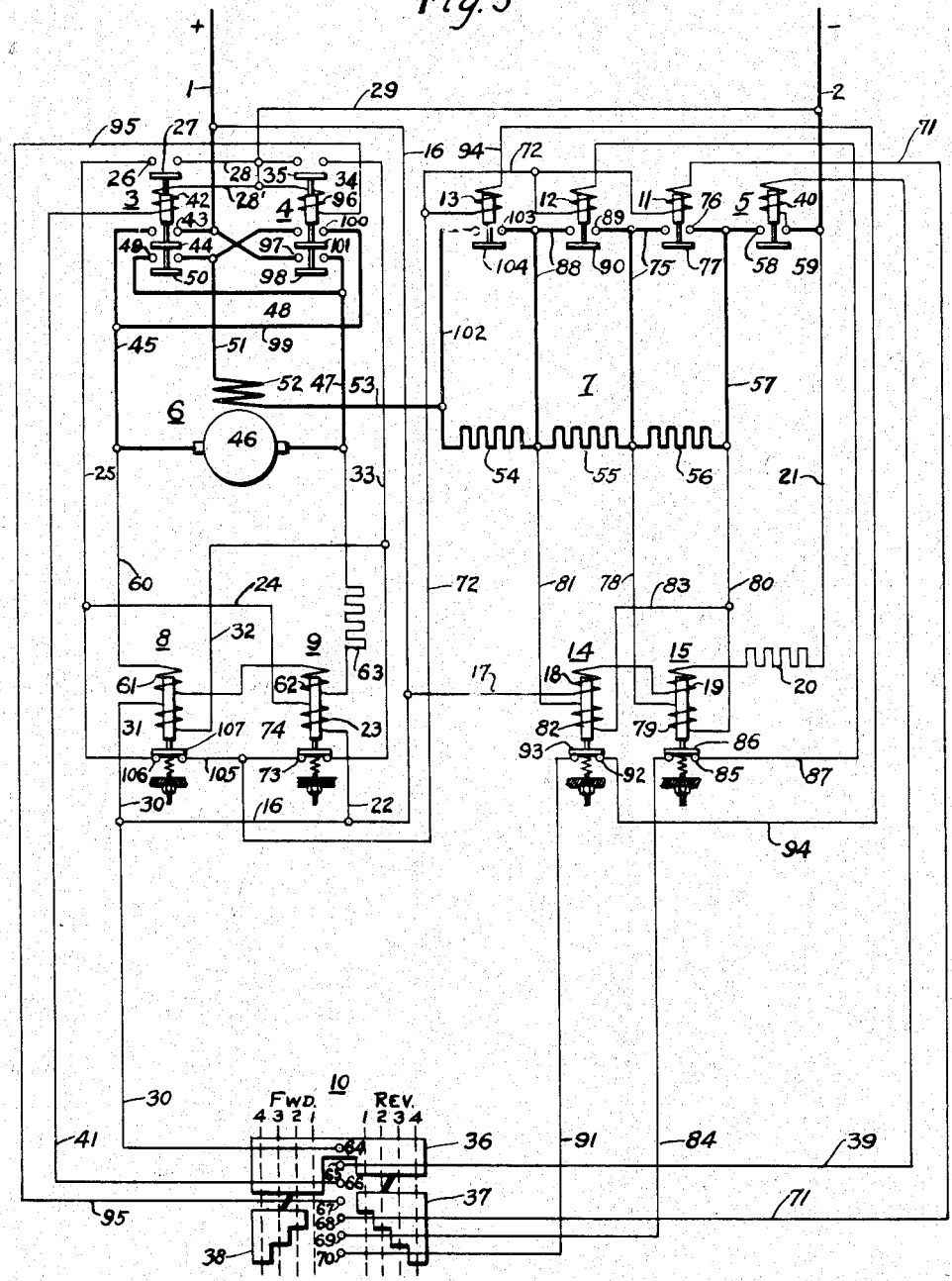

In the modification shown in Fig. 5, the neutralizating coils 18 and 19 of the time-limit relays 14 and 15 are energized while the controller is in the "off" position, as was made clear during the foregoing description. Movement of the controller to the "first forward" position causes the bridging of contact fingers 64, 65 and 66 by the controller segment 36. Two independent parallel circuits are thereby established for the line contactor 5 and the directional contactor 3, and in consequence contact members 26, 43, 49 and 58 are closed. The closure of contact members 43, 49 and 58 establishes a motor circuit through the resistor sections 54, 55 and the plugging resistor 56. When the contact members 26 are actuated to establish a circuit from the positive line 1, through conductors 16 and 22, magnetizing coil 23, conductors 24 and 25, contact members 26 closed by the interlock 27 on the directional contactor 3, conductors 28 and 29 to the negative line 2. Energization of coil 23 immediately causes the opening of contacts 73, the resistance drop across the resistor sections 55 and 56 opens contacts 85 and 92.

A circuit is also established which extends from one of the terminals of the motor 6 through the conductors 45, 47 and 60, neutralizing coil 61, of the reverse time-limit relay 8 and neutralizing coil 62, of the forward time-limit relay 9 and resistor 63 back to the motor. As long as the motor rotates in a forward direction, the magnetic effect of coils 62 and 23 is additive and contact members 73 are held in open position. Movement of the controller to the "second forward" position establishes a circuit from the positive line 1, through conductors 16 and 30, contact fingers 64 and 68, bridged by the connected controller segments 36 and 38, conductor 71, actuating coil 11 of the first accelerating relay, conductors 72 and 105, contact members 106 bridged by the bridging member 107, conductor 25, contact members 26, bridged by the interlock 27 and conductors 28 and 29 to the negative line 2. It will be noted that this modification (see Fig. 5) is different in this particular circuit from any of the other modifications described, since the control of the energization of the actuating coil 11 is subject directly to manual control modified to some extent by the operation of the time-limit relays 8 and 9. In this particular modification the plugging resistor section 56, while still of relatively high resistance value, functions as a conventional section of a starting resistor. By holding the controller in the "first forward" position the motor may be accelerated to a predetermined speed depending upon the load and the resistance value of the resistor sections 54, 55 and 56 combined.

Operation of the first accelerating relay by the energization of coil 11 short-circuits plugging resistor section 56, thereby deenergizing magnetizing coil 79 and after a predetermined interval of time, depending upon the adjustment of the time-limit relay 15, contacts 87 close. However, the closing of these contacts cannot establish any circuit because contact finger 69 is still not connected to the positive line 1. Movement of the controller to the "third forward" position causes the bridging of contact fingers 64 and 69 of the connected controller segments 36 and 38 and coil 12 is energized by a circuit through conductor 84, contacts 85, bridged by the bridging member 86, conductor 87, actuating coil 12 of the second accelerating relay, conductors 72 and 105, contacts 106, bridging member 107, conductor 25, contacts 26, bridged by the interlock 27 on the directional contactor 3 and thence to the negative line 2 through conductors 28 and 29.

Energization of actuating coil 12 causes the shunting of resistor section 55, deenergization of magnetizing coil 82, and the consequent closing of the contact members 92, after a predetermined interval of time depending upon the adjustment of the time-limit relay 14. The closing of contacts 92 does not necessarily establish a circuit for the actuating coil 13 of the third accelerating relay. Movement of the controller to the "fourth forward" position causes the bridging of contact fingers 64 and 70, thereby establishing a circuit through conductor 91, contacts 92, bridged by the bridging member 93, conductor 94, actuating coil 13, conductors 72 and 105, contact members 106, bridged by the bridging member 107, conductor 25, contact members 26, bridged by the interlock 27 on the directional contactor 3, and thence to the negative line 2 through the conductors 28 and 29. Operation of the third accelerating relay shunts resistor section 54 and the motor accelerates to full forward speed.

Attention is called to the fact that in the modification shown in Fig. 5 acceleration either in the forward or the reverse direction need not necessarily take place subject both to manual and automatic control. By rapid movement of the controller 10, say, to the fourth forward position, contact fingers 68, 69 and 70 are immediately bridged by the controller segments of the controller and then the acceleration takes place at a rate determined by the adjustment of the time limit relays 14 and 15. With this method of operation, the modification shown in Fig. 5 becomes very similar to the modification shown in Fig. 4.

The plugging operation may take place subject to both manual and automatic control, but in no case may the plugging operation take place at a more rapid rate than determined by the inertia of the load and the rotating armature and the time constant for which the time-limit relays 8 and 9 have been adjusted.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a control system for a reversing motor, including a source of power, a motor having an armature, directional contactors, a manually operable controller for determining the direction of rotation of the armature by control of the directional contactors, a plugging resistor section, means for shunting said resistor section, means operable after the lapse of predetermined intervals of time and responsive to the counter-electromotive force of the motor for controlling the resistor shunting means, a plurality of starting resistor sections, and means for successively shunting said starting resistor sections at different predetermined intervals of time.

2. In a control system for a reversing motor, including a source of power, a motor having an armature, directional contactors, a manually operable controller for determining the direction of rotation of the armature by control of the directional contactors, a plugging resistor section, means for shunting said plugging resistor section, means operable after deceleration of the motor and the lapse of a predetermined time interval for shunting the plugging resistor section, starting resistor sections for connection in the motor circuit, means for shunting said starting resistor sections, and time limit relays, said means for shunting said starting resistor sections being controlled by said manual controller and the time limit relays.

3. In a control system for a reversing motor, including a source of power, a motor having an armature and series field winding, a starting resistor having a plurality of sections, means for shunting said sections, directional contactors and a manually movable controller for determining the direction of rotation of the motor by control of the directional contactors, in combination with a plugging resistor for connection in series with the armature and series field winding, shunting means for the plugging resistor, and means operable after the lapse of a predetermined interval of time after plugging of the motor for controlling the plugging resistor shunting means.

4. In a control system for a reversing motor, including a source of power, a motor having an armature and series field winding, a starting resistor having a plurality of sections, means for shunting said sections, directional contactors and a manually movable controller for determining the direction of rotation of the motor by control of the directional contactors, in combination with a plugging resistor for connection in series with the armature and series field winding, shunting means for the plugging resistor and means responsive to the counter-electromotive force of the motor during plugging operation for controlling the operation of the plugging resistor shunting means.

5. In a control system for a reversing motor, including a source of power, a motor having an armature and series field winding, a starting resistor having a plurality of sections, means for shunting said sections, directional contactors and a manually movable controller for determining the direction of rotation of the motor by control of the directional contactors, in combination with a plugging resistor for connection in series with the armature and series field winding, shunting means for the plugging resistor and means operable after the lapse of a definite time and responsive to the counter-electromotive force of the motor during plugging operation for controlling the operation of the plugging resistor shunting means.

6. In a control system for a reversing motor, including a source of power, a motor having an armature and series field winding, a starting resistor having a plurality of sections, means for shunting said sections, directional contactors and a manually movable controller for determining the direction of rotation of the motor by control of the directional contactors, in combination with a plugging resistor for connection in series with the armature and series field winding, shunting means for the plugging resistor and controlling means operable after the lapse of a predetermined minimum time interval and responsive to the counter-electromotive force of the motor during plugging operation for controlling the operation of the plugging resistor shunting means, said controlling means being subject to control of the manual controller after the lapse of any time interval greater than said minimum predetermined time interval.

7. In a control system for a reversing motor, including a source of power, a motor, a starting resistor having a plurality of sections, means for successively shunting the starting resistor after the lapse of different predetermined intervals of time, directional contactors for determining the direction of rotation of the motor, and a manual controller for controlling the resistor shunting means, in combination with a plugging resistor, means for shunting the plugging resistor, and a pair of time-limit relays responsive to the counter-electromotive force of the motor and operable after the lapse of adjustable inherent time constants of the relays for controlling the operation of the plugging resistor shunting means.

8. In a control system for a reversing motor, including a source of power, a motor, a plurality of starting resistor sections, a plugging resistor section having higher resistance than one of the starting resistor sections, means for shunting the plugging resistor section during initial establishment of a circuit for the motor and source of power, means operable after the lapse of a predetermined interval of time for successively shunting the starting resistor sections, a manually operable controller, and means responsive to the direction of rotation of the motor with reference to the voltage impressed on the motor for controlling the time of operation of the means for shunting the plugging resistor.

9. In a control system for a reversing motor, including a source of power, a motor, directional contactors, a manually operable controller for effecting the operation of the directional contactors, a plurality of starting resistor sections, a plugging resistor section having a higher resistance value than the resistance value of any one of the starting resistor sections, means responsive to the counter-electromotive force of the motor for shunting the plugging resistor section, and means operable after the lapse of a predetermined interval of time for successively shunting the starting resistor sections at substantially definite intervals of time after the shunting of the plugging resistor section.

10. In a control system for a reversing motor, including a plurality of starting resistor sections for connection in series with the motor, a plugging resistor section having a higher resistance than any one of the starting resistor sections, means operable after the lapse of predetermined time intervals for shunting the starting resistor sections, directional contactors for selecting the direction of rotation of the motor, a manually operable controller for effecting the operation of said directional contactors, of means for controlling the plugging operation to prevent excessive currents in the motor circuit comprising a polarized plugging relay responsive to the counter-electro-motive force of the motor to control the means for shunting the plugging resistor, and means for controlling the sequence of operation of said plugging resistor and starting resistor shunting means.

11. In a control system for a reversing motor, including a source of power, a motor having an armature and field windings, a starting resistor having a plurality of sections, means operable after the lapse of predetermined intervals of time for shunting the starting resistors at predetermined intervals of time after energization of the motor armature, directional contactors, and a manually operable controller for determining the direction of rotation of the motor by control of the directional contactors, in combination with a plugging resistor for connection in series with the motor during plugging operation, shunting means for the plugging resistor, and means responsive to a predetermined counter electro-motive force of the motor and operable a predetermined interval of time after the predetermined counter-electromotive force has been attained by the motor for controlling the shunting means for the plugging resistor during the plugging operation.

12. In a control system for a reversing motor, including a source of power, a motor having an armature and field windings, a starting resistor having a plurality of sections, means operable after the lapse of predetermined intervals of time for shunting the starting resistors at predetermined intervals of time after energization of the motor armature, directional contactors, in combination with a plugging resistor for connection in series with the motor during plugging operation, shuntilng means for the plugging resistor, means responsive to the counter-electromotive force of the motor and operable a predetermined interval of time after the counter-electromotive force has attained a predetermined value for controlling the shunting means for the plugging resistor during the plugging operation, and a manually operable controller for effecting the operation of the directional contactors and for further controlling the shunting means for the plugging resistor and the starting resistor sections.

13. In a control system for a reversing motor, including a source of power, a motor having an armature and field windings, a starting resistor having a plurality of sections, means operable after the lapse of predetermined intervals of time for shunting the starting resistors at predetermined intervals of time after connecting said source of power to the motor, directional contactors, in combination with a plugging resistor for connection in series with the motor during plugging operation, shunting means for the plugging resistor, a pair of relays one operable to control the plugging resistor shunting means when the motor is plugged after forward operation and the other operable to control the plugging resistor shunting means when the motor is plugged after reverse operation, said relays being responsive to the counter-electromotive force of the motor and operable at predetermined time intervals after the counter-electromotive force has attained a predetermined value, and a manually operable controller for selectively effecting the operation of the directional contactors and for further controlling the shunting means for the plugging resistor and the starting resistor sections.

14. In a control system for a reversing motor, including a source of power, a motor having an armature and field windings, a starting resistor

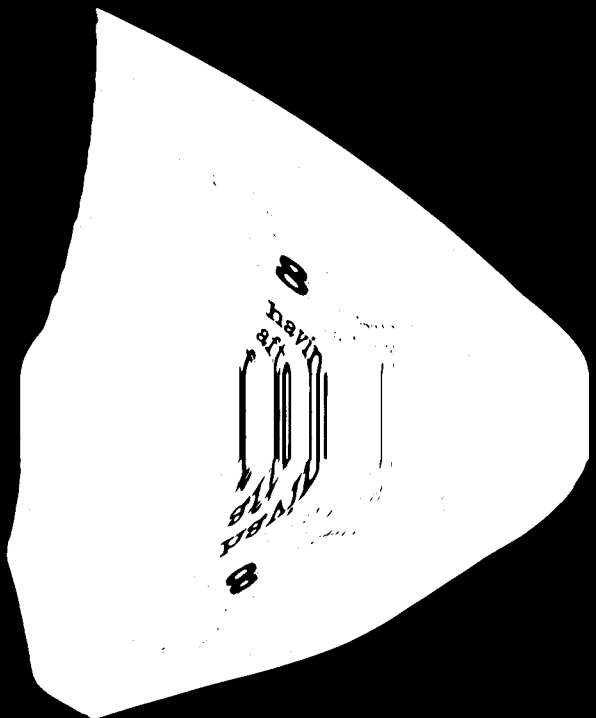

vice provided with an armature for controlling the operation of the contactor, and a relay for controlling the contactor and having a main exciting coil and also having an auxiliary coil connected across the motor armature, said electric device being designed to operate a definite time interval after the excitation of the auxiliary coil of said relay, connected across the motor armature, has decreased to a predetermined value.

22. In a motor control system, in combination, a motor, a source of power for the motor, reversing means for connecting the motor to the source of power to operate it in either direction, a plurality of resistor sections for limiting the voltage applied to the motor, a plugging resistor section, a plurality of resistor-shunting means for shunting all the resistor sections to increase the voltage applied to the motor, control means responsive to the line voltage for controlling the operation of the resistor-shunting means for the plugging resistor, means responsive to the counter-electromotive force of the motor cooperating with the control means to retain the control means in the position to which it has been actuated by an application of line voltage to prevent the operation of the shunting means for the plugging resistor when the reversing means is actuated to cause a reversal in the application of the voltage of the motor, time-limit means for successively effecting the operation of the resistor starting means and means operable by the plugging resistor shunting means for controlling the time-limit means.

WILLARD G. COOK.